United States Patent Office 3,402,169
Patented Sept. 17, 1968

3,402,169
POLYHALOGENOUS POLYHYDROXY ETHERS
Donald R. Jackson, deceased, late of Southgate, Mich., by Ruth H. Jackson, special administratrix, Southgate, Mich., assignor to Wyandotte Chemicals Corporation, Wyandotte, Mich., a corporation of Michigan
No Drawing. Filed Jan. 2, 1964, Ser. No. 335,432
14 Claims. (Cl. 260—210)

The present invention relates to halogenated polyhydroxy ethers, and is more particularly concerned with novel polyhalogenous polyhydroxy ethers characterized by the presence of pendant polyhaloalkly groups, which ethers are useful as intermediates for the preparation of more complex polymeric compositions having certain improved properties, such as enhanced resistance to combustion.

Polyhydroxy ethers constitute a well known and extremely useful class of compounds. Many such compounds possess outstanding detergent properties, and are widely used as cleaners and emulsifiers. They have been successfully employed as bases, carriers and stabilizers for antibiotics and other pharmaceuticals. When they are reacted with compounds which introduce hydrophilic groups, as for example, ethylene oxide, they yield excellent surface-active agents. One of the more important applications of polyhydroxy ethers is as intermediates in the preparation of resinous polymers. Such polymers are prepared by reacting the polyhydroxy ether with a polyfunctional chain-forming compound, wherein the chain-forming compound has functional groups capable of reacting with the free hydroxy groups of the polyhydroxy ether. Representative of such polyfunctional chain-forming compounds are the polyisocyanates. The chain-forming compound and the polyhydroxy ether react to form a polymeric product in which molecules of the chain-forming compound form molecular bridges between molecules of the polyhydroxy ether. Polymeric products of this type have found wide use as plastics, coatings, elastomers, foams, rubbers, etc. Unfortunately, the use of these potentially valuable products is frequently limited by the fact that the polymeric material is flammable and readily consumed by fire. Consequently, for many applications, materials which are more fire-resistant must be used.

Although fire-resistant additives such as phosphates and phosphites are sometimes incorporated in normally flammable polymers for the purpose of reducing flammability, they often reduce flammability at the expense of the loss of certain desirable properties, such as, for example, compressive strength and moisture transmission. When exposed to weathering conditions, additives often break down, leaving the resinous composition unprotected. Some additives are only physically incorporated into the composition and may evaporate or otherwise be lost over a period of time. In many instances the presence of additives may cause the composition to crumble and disintegrate with age. As a result, although some additives do in fact introduce a certain degree of fire resistance, their attendant disadvantages make it desirable to utilize other methods of improving the fire-resistant properties of polyhydroxy ether-based compositions.

It is accordingly an object of the present invention to provide a new and useful class of polyhalogenous polyhydroxy ethers. An additional object is the provision of a novel class of polyhalogenous polyhydroxy ethers which are useful as intermediates in the preparation of more complex polymeric compositions having a high degree of non-flammability, and which, in some cases, may even be completely non-burning. Another object is to provide a new class of polyhydroxy ethers which have a high permanently-retained halogen content. Still an additional object is the provision of a class of polyhalogenous polyhydroxy ethers, which ethers are useful in the preparation of hydroxy ether-based compositions having a high chemically combined halogen content. Still an additional object is to provide a process for the preparation of such polyhalogenated polyhydroxy ethers. Additional objects will be apparent to one skilled in the art, and still other objects will become apparent hereinafter.

It has now been found that the foregoing and additional objects may be accomplished by the provision of a novel class of polyhalogenated polyhydroxy ethers having at least one non-cyclic ether linkage and a relatively high halogen content. The ethers are further characterized by the presence of pendant lower alkyl groups having a maximum of two carbon atoms and containing at least two and preferably three halogen atoms attached to the same terminal carbon atom. The polyhydroxy ethers of the invention may be further reacted with compounds such as polyisocyanates containing functional groups capable of reacting with the free hydroxy groups of the polyhydroxy ether to provide polymeric products having a high-degree of non-flammability. Many of these products may be self-extinguishing, and some even non-burning. By the term "self-extinguishing" is meant that the composition will burn when exposed to a flame source, but will stop burning once the flame source has been removed, and before the composition has been completely consumed. By the term "non-burning" is meant that the composition will not even begin to burn when directly exposed to a flame source.

Polyhalogenous polyhydroxy ethers may be reacted with such reactive compounds as polyisocyanates to form coating materials from which films may be produced exhibiting excellent adhesive properties toward a variety of surfaces such as metal surfaces. They may also be reacted with compounds which introduce hydrophilic groups, for instance, alkylene oxides, to yield excellent surface active agents. In addition, the present compounds may be used in numerous ways to introduce a high halogen content into many compositions and products, for example, by cross-linking or chain-extension of polyurethanes, polyesters, polyesteramides, glyptals, alkyds, and numerous other condensation type polymers.

The polyhalogenous polyhydroxy ethers of the present invention are ethers of a polyhalogenous alkylene oxide and a polyhydric alcohol chain initiating compound which may contain from two to eight hydroxy groups. The ethers may be prepared by reacting the polyhydric alcohol initiating compound, or mixtures thereof, with one or more polyhalogenous alkylene oxides, or mixtures of polyhalogenous alkylene oxide with non-polyhalogenous alkylene oxides.

It is well known in the field of alkylene oxide chemistry that when a reactive hydrogen compound is subjected to oxyalkylation, a compound is produced which is in fact a polymer of the alkylene oxide, having the reactive hydrogen compound as a terminal group. Further, when a large proportion of alkylene oxide to reactive hydrogen compound is used, the reaction product is not a single molecular compound having a defined number of oxyalkylene radicals but, rather, a mixture of closely related or touching or adjacent homologs wherein the statistical average number of oxyalkylene groups equals the relative number of moles of the alkylene oxide employed, and the individual members present in the mixture contain varying numbers of polyoxyethylene groups. Thus, the compositions of this invention are mixtures of compounds which may be defined in terms of molecular weight and weight percent. For convenience in referring to such products as are produced by the process of the present invention, the term "cogeneric mixture" is sometimes employed. This term has been coined to designate the mixture of a series of closely related homologs that are obtained by condensing a plurality of alkylene oxide units with a reactive hydrogen compound, and is defined in greater detail in U.S. Patent 2,549,438. Consequently, although throughout the specification and claims the products of the present invention are termed "ethers" or "polyethers," it is to be understood that these terms include within their meanings cogeneric mixtures of ethers and polyethers of varying molecular weights.

The reactions of the present invention result in the production of polymers comprised of one moiety from the initiating compound and one moiety from the alkylene oxide. When two different alkylene oxides, as for example 1,1,1-trichloro-2,3-epoxypropane and propylene oxide, are used to form the polyether, the resulting structure may be either one of two types. If the two alkylene oxides are first mixed and then reacted together with with the initiating compound, a "heteric" structure results, that, is one in which the molecules of the two alkylene oxides are randomly dispersed throughout the chain. Alternatively, when one alkylene oxide is first reacted with the initiating compound, and subsequently the second alkylene oxide is so reacted, a "block" type of polymer results. The structure of this type of polymer is comprised of a block of one polymerized alkylene oxide connected to a block of the other polymerized alkylene oxide.

The polyhalogenous alkylene oxide, and non-polyhalogenous alkylene oxide, if such be used, react with the free hydroxy groups of the polyhydric alcohol initiating compound to produce an adduct wherein the initiating compound is bonded through one or more of the oxygen atoms (forming an ether linkage). These oxyalkylene radicals, which now contain terminal hydroxyl groups, can in turn be bonded through the oxygen atom to additional oxyalkylene radicals. The adduct is characterized by pendant polyhalogenous alkyl groups.

Alkylene oxides react readily with hydroxyl groups. Those on the initiating compound are available, and the initial reaction generally takes place with those groups. During the reaction, a terminal hydroxyl group is formed on the alkylene oxide moiety and this group is subsequently available for reaction with other alkylene oxides. It appears that generally the reactivity of the alkylene oxide is greater toward the first hydroxy group of the hydroxy compound than toward the second hydroxy group of a hydroxy compound which has already been reacted through another hydroxy group with an alkylene oxide molecule. In a few exceptional cases, however, as where polyhydroxy initiators of higher functionality are used, this reaction selectivity may be less marked. Therefore, by controlling the relative amounts of the reactants it is generally possible to limit the degree of addition, and thus to control the molecular weight of the product. For example, it has been found in practice that, when the alkylene oxide and polyhydroxy compound are reacted in equimolar quantities, polyhydroxy ethers are obtained which substantially comprise adducts of one molecule of alkylene oxide and one molecule of hydroxy compound, although small amounts of diadducts and triadducts may additionally be formed. When the proportion of oxide to hydroxy compound is increased, the average number of alkylene oxide units to each hydroxy compound unit is correspondingly increased.

The polyhalogenous alkylene oxides which are employed as starting materials to prepare the polyethers are vicinal alkylene oxides containing from three to four carbon atoms, and having attached to a carbon atom of the oxirane ring a lower-alkyl group having up to two carbon atoms and containing at least two and preferably three halogen atoms attached to the terminal carbon atom. The term "oxirane ring" refers to a three-membered cyclic ether group represented by the formula:

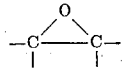

wherein the ether oxygen is bonded to adjacent carbon atoms. Representative of such polyhalogenous alkylene oxides are 1,1-dichloro-2,3-epoxypropane,
1,1,1-trichloro-2,3-epoxypropane,
1,1,1-trifluoro-2,3-epoxypropane,
1-bromo-1,1-dichloro-2,3-epoxypropane,
1,1-dichloro-1-fluoro-2,3-epoxypropane,
1,1-difluoro-1-chloro-2,3-epoxypropane,
other mixed 1,1,1-trihalo-2,3-epoxypropanes,
1,1,1-tribromo-3,4-epoxybutane,
1,1,1-trichloro-3,4-epoxybutane,
1,1-dichloro-3,4-epoxybutane,
1,1,1,2,2-pentachloro-3,4-epoxybutane,
1,1,1,4,4-pentachloro-2,3-epoxybutane,
1,1,1,2,2-pentafluoro-3,4-epoxybutane,
1,1,1,2,2-mixed pentahalo-3,4-epoxybutane, etc.

Tetrahaloepoxybutanes such as 1,1,4,4-tetrachloro-2,3-epoxybutane, 1,1,2,2-tetrachloro-3,4-epoxybutane and 1,1,1,2-tetrachloro-3,4-epoxybutane may also be used, as well as related compounds utilizing other halogens. As is obvious from these examples, the halogens bonded to these polyhalogenated alkylene oxides, and consequently to the pendant polyhalogenoalkyl groups of the polyhalogenous polyhydroxy ethers, may be any halogen or mixture of halogens. Of the halogens, those having atomic weights of 19 to 80, including fluorine, chlorine, and bromine, are preferred. Preferably, all three of the substitutable valences of the terminal carbon atom of the polyhaloalkyl group are satisfied by halogen atoms.

The polyhalogenous epoxypropanes used in the present invention for the preparation of polyhalogenous polyhydroxy polyethers may be prepared by known methods such as by the dehydrohalogenation of the appropriate polyhalogenated secondary alcohol in sodium hydroxide solution. For example 1,1-dichloro-2,3-epoxypropane may be prepared by the dehydrohalogenation of 1,1,3-trichloro-2-propanol. 1,1,1-trichloro-2,3-epoxypropane may be prepared by the dehydrohalogenation of 1,1,1,3-tetrachloro-2-propanol. The propanol used in the process may in turn be prepared in known manner by the reduction of the appropriate halogenated acetone with aluminum isopropoxide in isopropanol .

1,1,1-trichloro-2,3-epoxypropane may also be prepared by the reaction of chloral with diazomethane in ether solution, as described by S. Schlotterbeck, Ber. 42, 2561 (1909).

The 1-polyhalogeno-3,4-epoxybutanes may be prepared by reacting the appropriate polyhalomethane with 1-hydroxypropene-2 in the presence of a source of free radicals, and dehydrohalogenating the resulting adduct with a base, as described in Canadian Patent No. 527,462. 1,1,1-trichloro-3,4-epoxybutane may be prepared by the partial dehydrohalogenation of 1,1,1-trichloro-3-bromo-4-butanol in the presence of potassium hydroxide, as disclosed in U.S. Patent No. 2,561,516.

When the polyhalogenous alkylene oxides react, the oxirane ring is opened with the breaking of an oxygen bond to form a bivalent radical wherein the members of the oxirane group form a bivalent linear chain having the polyhalogenous loweralkyl group, originally attached to a carbon atom of the oxirane ring, as an extra-linear substituent. The bivalent oxyalkylene radical may be bonded through one valence by way of an ether linkage to the polyhydroxy initiating molecule, or through one or both valences to oxyalkylene radicals to form a polyoxyalkylene chain.

More than one of the above-described polyhalogenous alkylene oxides may be employed, as well as mixtures of the above-described polyhalogenous alkylene oxides with mono-halogenous or non-halogenous alkylene oxides. The use of such mixtures is often advantageous in that it may result in an improvement of some of the properties of the polyether, such as viscosity and color. For example, the use of a mixture of 1,1,1-trichloro-2,3-epoxypropane and propylene oxide (2:1 molar ratio) and utilizing trimethylolpropane as a chain initiating compound, results in polyhydroxy polyether products having reduced viscosity, improved color, and improved solubility in low boiling chlorofluorohydrocarbons, as for example the Freons, in comparison to the corresponding polyhydroxy polyethers prepared from 1,1,1-trichloro-2,3-epoxypropane alone. Solubility in low boiling chlorofluorohydrocarbons is desirable because these materials are used as blowing agents in the production of foams, where high solubility enables the blowing agents to be evenly distributed through the formulation. Other commercial products of the same type are the Genetrons, marketed by General Chemical Division; Ucon Propellants, marketed by Union Carbide; and Isotrons, marketed by Pennsalt.

Suitable alkylene oxides which may be used as co-reactants with the polyhalogenous alkylene oxides are the alkylene oxides which are either saturated or free from other than aromatic unsaturation. They include loweralkylene oxides such as ethylene, propylene, butylene, and isobutylene oxides, other alkylene oxides such as dodecene oxide, epichlorohydrin, epibromohydrin, etc., aromatic alkylene oxides such as styrene oxide, chlorostyrene oxide, etc., epoxy ethers, and so forth. When mixtures of polyhalogenous and non-polyhalogenous alkylene oxides are used to impart fire resistance into a composition, the amount of the non-polyhalogenous alkylene oxide should be limited. Thus, when a mono- or non-halogenous alkylene oxide is employed as part of the starting alkylene oxide reactant, the polyhalogenous alkylene oxide component should comprise at least 10% by weight of the mixture, and a considerably higher proportion is preferred.

In general, it has been found that a minimal halogen content of 45% by weight is normally required in the polyether when it is to be used as an intermediate in the preparation of more complex compositions such as polymers having improved fire resistance.

A wide range of polyhydroxy initiating compounds containing from two to eight hydroxy groups inclusive may be used to prepare the polyethers of the present invention. Aliphatic, cycloaliphatic and aromatic polyhydric alcohols are preferred, but others may also be used, including polyhydric ether alcohols, polyhydroxy ketones and aldehydes, polyhydroxy esters, polyurethane glycols, polyester amide glycols, etc. The polyhydroxy compounds used in preparing the ethers of the present invention also include those polyhydroxy substituted compounds with groups unreactive to epoxy groups, such as halogen.

Representative polyhydric alcohol initiators include glycols such as ethylene glycol, propylene glycol, isobutylene glycol, trimethylene glycol, butanediol-2,3, 1,4-dihydroxy-2-butene, 1,12-dihydroxy octadecane, 1,4-dihydroxycyclohexane, 2,2 - dimethyl-1,3-propanediol, 2-ethyl-2-butylpropanediol-1,3, polyols such as glycerine, erythritol, sorbitol, mannitol, inositol, trimethylolpropane, pentaerythritol, as well as polyvinyl and polyallyl alcohol, bis(4 - hydroxycyclohexyl) dimethylmethane, tetramethylolcyclohexanol, 1,4-dimethylolbenzene, 4,4'-dimethyloldiphenyl, dimethylol xylenes, dimethyloltoluenes, dimethylolnapthalenes, etc.; halogen-substituted polyols such as glycerine monochlorohydrin, 1,4-dichloro - 2,3 - hydroxybutane, 2,2,3,3-tetrachlorobutanediol-1,4, 3,3,3-trichloro - 1,2 - propylene glycol, 3,3 - dichloropropanediol-1,2, monochlorohydrin of pentaerythritol, monochlorohydrins of sorbitol, dichlorohydrins of sorbitol, monochlorohydrins of mannitol, dichlorohydrins of mannitol; polyhydric ether alcohols such as diglycerol, triglycerol, dipentaerythritol, tripentaerythritol, dimethylolanisols, methylether of glycerine, isopropyl thioether of glycerine, condensates of alkylene oxides such as ethylene oxide, propylene oxide, butylene oxide, epichlorohydrin, glycidyl ethers, etc., with polyhydric alcohols such as the foregoing and with polyhydric thioether alcohols such as 2,2' - dihydroxy - diethylsulfide, 2,2',3,3'-tetrahydroxydipropylsulfide, 2,2',3 - trihydroxy-3' - chlorodipropylsulfide, etc.; hydroxy aldehydes and ketones such as dextrose, fructose, glyceraldehyde, saccharides such as sucrose, maltose, etc.; hydroxy esters such as monoglycerides, monoesters of pentaerythritol, etc.

One of the primary considerations in selecting a polyhydroxy initiator is the functionality desired in the polyhydroxy polyether product. An examination of the structure of the products obtained confirms the fact that the functionality of a polyhydroxy ether is the same as the functionality of the initiating compound used to prepare it. For example, when a triol is used as the polyhydroxy initiating compound, a trihydric ether is obtained as the product. When a tetrol is used as the initiating compound, a tetrahydric ether is obtained. When these ethers are to be used in the preparation of polyurethanes, the degree of functionality directly influences the degree of cross-linking in the polyurethane composition and, consequently, the rigidity and hardness of the product. In general, the greater the degree of cross-linking, the harder and more rigid the product. Consequently, more highly functional polyhydroxy polyethers are normally preferred when preparing hard, rigid polyurethane products. When softer, more flexible polyurethane foams are desired, less highly functional polyhydroxy ethers, such as dihydric ethers, should be utilized, and consequently, less highly functional polyhydroxy initiating compounds should be employed for the preparation of the polyethers.

By controlling the proportions of alkylene oxide to polyhydric initiating compounds, it is generally possible to limit the degree of addition and, consequently, the molecular weight of the products. Molar excesses of polyhydroxy initiating compound are preferred when the mono adduct is desired. Adducts having an average compoistion of one alkylene oxide unit per hydroxy group of the polyhydroxy initiating compound can be obtained by reacting the alkylene oxide with the polyhydroxy initiating compound in a ratio of one mole of alkylene oxide per hydroxy group of the initiating compound. For example, a three to one adduct of 1,1,1-trichloro-2,3-epoxypropane and glycerine is obtained by reacting three moles of the alkylene oxide with one mole of the triol. Higher polymeric products are obtained if the molar ratio of oxide to hydroxy compound is increased still further.

In general, it is preferred to use a ratio of about 1 to 4 moles of alkylene oxide per mole of polyhydroxy initiating compound for each equivalent of hydroxy groups of the polyhydroxy initiating compound, although, if desired, more or less may be used. Thus, for example, the preferred ratios of alkylene oxide to glycerine are in the range of about 1:1 to about 12:1, although ratios of alkylene oxide to glycerine of up to 24:1 may be used if desired.

A variety of catalysts may be employed to effect the reaction of the alkylene oxide, with or without the polyhydric initiator. The catalysts include those of the Friedel-Crafts type such as boron trifluoride, ferric chloride, anhydrous aluminum trichloride, zinc chloride, stannic chloride, antimony trifluoride, and complexes of these catalysts, such as boron trifluoride etherates, etc.; acid type catalysts such as hydrofluoric acid, acid fluoride salts such as potassium acid fluoride, fluoboric acid, fluosilicic acid, fluoplumbic acid, perchloric acid, sulfuric acid, phosphoric acid, etc., other catalysts such as antimony pentachloride, alkoxides and alcoholates of aluminum, etc. The preferred catalysts are of the Lewis acid type, including the aforesaid Friedel-Crafts and acid types, and especially boron trifluoride and its etherates. The amount of catalyst to be used depends on the compound used as catalyst and upon the reaction conditions. Amounts of catalyst up to 10% by weight based on the amount of reactants may be used, with smaller amounts, e.g., up to 2% or 3%, being generally satisfactory and economically preferred. For example, when boron trifluoride is used as the catalyst, good results are obtained with amounts ranging from a few hundredths of 1% to 5%, the preferred range being from about 0.17% to about 0.5% based on the total quantities of reactants. When small amounts of catalyst are used, the rate of reaction is generally slower, and it may be necessary to use higher reaction temperatures.

It has also been found that certain of the polyhalogenated alkylene oxides will polymerize at high temperatures with polyhydroxy initiators even in the absence of a catalyst. For example 1,1-dichloro-2,3-epoxypropane and 1,1,1-trichloro-2,3-expoxypropane were each successfully reacted with trimethylolpropane in the absence of catalysts at 175 to 200° C. However, the extent of such reaction is limited, for example, to no more than about 2.5 moles of oxide per mole of hydroxy compound when triols are used as the polyhydroxy initiating compound. The use of a catalyst, therefore, is normally preferred.

Often it is advantageous to introduce the catalyst in a solvent or carrier. For example, boron trifluoride, which is a gas under normal conditions, is most conveniently used in the form of its etherate. As previously stated, the reaction itself may be conducted with or without a solvent. If a solvent is desired, preferred solvents are those which are substantially unreactive to the reactants and products, and include aromatic and non-aromatic hydrocarbons, halogenated hydrocarbons, ethers, etc. Suitable solvents are hexane and benzene, and combinations thereof with halogenated hydrocarbons such as Freons. In general, it is not necessary to use a solvent and good results can be obtained without one.

The polymerization of the polyhalogenated alkylene oxide with an initiating compound can be carried out in a variety of ways. In one method the catalyst, with or without a diluent, is added to a mixture of alkylene oxide and polyhydroxy initiating compound. A mildly exothermic reaction generally results and can be cooled externally. The mixture is maintained at a suitable reaction temperature for a period of time until the reaction goes to completion. The product is then purified by removing volatile impurities by any convenient procedure as, for example, vacuum stripping. In a variation of this method a mixture of the polyhaloalkylene oxide and polyhydroxy initiating compound is initially reacted in the presence of a reaction catalyst, and then treated with additional alkylene oxide. A wide range of temperatures from about 25° to about 225° C. may be used, and preferably between about 60° and 100° C.

In an alternate procedure the alkylene oxide is added gradually over a period of time to a mixture of catalyst and initiator. This method has the advantage that the epoxide may be added at such a rate that the heat of the exothermic reaction keeps the reaction mixture at a satisfactory temperature without external heating or cooling. In a variation, a mixture of all or part of the reactants is added gradually to the reaction zone. The procedure may be the same whether one or more polyhaloalkylene oxides or mixtures thereof with non-polyhaloalkylene oxide are employed as reactants, and whether or not more than one polyhydroxy initiating compound are employed as reactants.

After the reaction has gone to completion, the product may be purified by any suitable means, such as vacuum stripping.

The polyhalogenous alkylene oxides may also be reacted with a polyhalogenous polyhydroxy initiating compound to form highly halogenated ethers. For example 1,1,1-trichloro-2,3-epoxypropane may be reacted with the glycol corresponding to the oxide or with similar polyhalogenous glycols. In carrying out the reaction the glycol is first reacted with the boron trifluoride catalyst as follows:

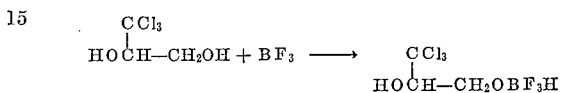

The product formed is then reacted with the oxide:

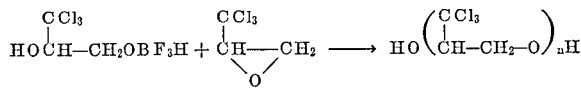

The resultant product is a highly halogenated polyhydroxy ether. The polyhalogenated polyhydroxy ethers of the present invention range from viscous liquids to very viscous, glassy, brittle materials, and range in color from clear and light yellow to dark and even black. They are useful for most of the applications in which polyhydroxy ethers are presently used, and especially for applications where the high halogen content of the polyhydroxy ethers of the present invention can be of special value. They are also useful for certain applications in which conventional polyhydroxy ethers are not presently used, but for which applications the high halogen content and properties of the compounds of the present invention would render them usable.

The compounds of the present invention may be reacted with chain-forming polyfunctional compounds containing functional groups capable of reacting with the free hydroxy groups of the ether to give more complex polymeric products. Suitable poly-functional compounds include, among others, polycarboxy acids and acid anhydrides, polyisocyanates, and polyepoxides. The products so obtained have a wide variety of physical and chemical properties and may be used in such diverse applications as coatings and paints, elastomers, rubbers, foams, fibers, and so forth. As an example of such a utilization, the products of the present invention may be reacted with organic diisocyanates to give polyurethane compositions which may be used as elastomers, coatings, etc. Such polyurethane compositions may be expanded by the use of a blowing agent to give soft and flexible to hard and rigid foams. The polyurethanes so obtained are generaly self-extinguishing, and frequently non-burning. Moreover, the fire-resistant properties are permanent and are obtained without substantial diminution of other desirable properties of the composition. The products of the present invention may also be reacted with compounds which introduce hydrophilic groups into the molecule, for example ethylene oxide, to give surface-active agents.

The following examples are given by way of illustration only and are not to be construed as limiting.

EXAMPLE 1

1:1 adduct of 1,1-dichloro-2,3-epoxypropane and trimethylolpropane

A mixture of 134 grams (1 mole) of trimethylolpropane and 42.33 grams (0.33 mole) of 1,1-dichloro-2,3-epoxypropane was heated to a clear melt at 61° C., and 0.5 ml. of a boron trifluoride etherate solution added. The resulting reaction was exothermic, and was cooled externally with tap water to maintain a constant reaction temperature. The reaction mixture was maintained between 70° and 80° C. for two hours, applying heat when necessary. It was then cooled, and an equal volume of water added thereto. The resulting mixture was extracted with ether, and the ethereal extract washed with water, dried over sodium sulfate, filtered, and stripped of solvent at 44° C. at atmospheric pressure. The residue was then vacuum stripped of unreacted monomers up to a temperature of 190° C. at 1.3 millimeters of mercury. The product, which was light amber colored and soluble in water, weighed 53 grams. Assuming a 1:1 adduct, this represents a 62% yield.

*Analysis.*—Calculated for $C_9H_{18}Cl_2O_4$: Cl, 27.2%; hydroxy number, 645. Found: Cl, 29.9%; hydroxy number, 616.

EXAMPLE 2

3:1 adduct of 1,1-dichloro-2,3-epoxypropane and trimethylolpropane

To 44.7 grams (0.33 mole) of molten trimethylolpropane at 70° C. were added 2 ml. of an ethyl ether solution of boron trifluoride. One hundred twenty-seven grams (1 mole) of 1,1-dichloro-2,3-epoxypropane were then added gradually over a period of two hours at such a rate that the temperature of the reaction mixture was maintained between 65° and 80° C. by the heat liberated during the exothermic reaction, without recourse to auxiliary external heating or cooling. The reaction mixture was allowed to stand overnight, and was then stripped of unreacted monomers by maintaining the mixture for two hours at 200° C. at 1.3 millimeters of mercury, leaving a residue weighing 154 grams. Assuming a three to one adduct, this is a 96% conversion.

*Analysis.*—Calculated for $C_{15}H_{26}Cl_6O_6$ (3:1 adduct): Cl, 41.4%; hydroxyl number, 327. Found: Cl, 43.3%; hydroxyl number, 330.

EXAMPLE 3

3:1 adduct of 1,1-dichloro-2,3-epoxypropane and trimethylolpropane

This example illustrates the use of a solvent for the reaction. To a mixture of 13.4 g. (0.1 mole) of trimethylolpropane and 41.11 g. (0.33 mole) of 1,1-dichloro-2,3-epoxypropane dissolved in 200 ml. of anhydrous ethyl ether was added a solution of 8 ml. of boron trifluoride etherate in 2 ml. of anhydrous ethyl ether. The resulting mixture was maintained at 5° C. for one hour, and then allowed to stand at room temperature for 4 days. The reaction mixture was then filtered, neutralized, and washed with ether. After evaporation of the ether, the residue was stripped under vacuum to give 42.5 grams of product.

EXAMPLE 4

3:1 adduct of 1,1-dichloro-2,3-epoxypropane and glycerine

In the manner of Example 2, 127 g. (1 mole) of 1,1-dichloro-2,3-epoxypropane were added gradually over a period of 3.5 hours to a mixture of 32 g. (0.33 mole) of 95% glycerine and 2 ml. of boron trifluoride etherate. The temperature was maintained at 30° C. to 40° C. with intermittent external cooling. Volatile materials were removed by heating the reaction mixture under a vacuum. The residue, a very viscous amber-colored liquid, weighed 100% of theory. Its hydroxyl number was determined to be 348, corresponding to a molecular weight of 483. The theoretical molecular weight of a 3:1 adduct is 473.

EXAMPLES 5 THROUGH 11

Adducts of polyhalogenated alkylene oxides and polyhydric alcohol initiator

In the manner of Example 2, various mixtures of polyhalogenated alkylene oxide and polyhydric alcohol initiating compounds were mixed with a catalyst and reacted at elevated temperatures. The reactants, reaction conditions, and results for each experiment are summarized in Table I. The oxides employed in these examples were 1,1-dichloro-2,3-epoxypropane, represented by DCEP, and 1,1,1-trichloro-2,3-epoxypropane, represented by TCEP. The polyhydric alcohol initiators were glycerine and trimethylolpropane, the latter represented by TMP. The catalysts were boron trifluoride etherate ($BF_3Et$) and stannic chloride ($SnCl_4$). The reaction times and temperatures are recorded in the column denoted as "Reaction Conditions." The products were all yellow to brown-colored viscous liquids.

TABLE I.—ADDITION OF CHLORINATED OXIDES TO HYDROXY COMPOUNDS

Summary of Reactions

| Example | Oxide Used (1) | Polyhydroxy Initiator (2) | Mole Ratio, (1)/(2) | Catalyst, grams | Reaction Conditions | | Product, wt. percent of theory | Hydroxyl number, mol. wt. | Chlorine in Product, percent |
|---|---|---|---|---|---|---|---|---|---|
| | | | | | Addn. Time, min. | Temp., °C. | | | |
| 5 | DCEP | Glycerine | 3:1 | 14.2 | 162 | 48–52 | 75.0 | 452 | 50.2 |
| 6 [1] | DCEP | do | 3:1 | 14.2 | 135 | 41–49 | 84.2 | 443 | 45.8 |
| 7 | TCEP | do | 3:1 | 4.6 | 133 | 60–71 | 95.4 | 493 | 55.3 |
| 8 | DCEP | TMP | 3:1 | 6.7 | 64 | 57–64 | 95.4 | 460 | 41.3 |
| 9 [2] | DCEP | TMP | 3:1 | 6.7 | 217 | 60–143 | 70 | 370 | |
| 10 | DCEP | TMP | 4:1 | 6.7 | 69 | 64–74 | 98.1 | 569 | 44.8 |
| 11 | DCEP | TMP | 6:1 | 6.7 | 131 | 52–60 | 97.6 | 802 | 47.0 |

[1] 55.5 grams methylene dichloride as solvent; no solvent used in other examples.
[2] $SnCl_4$ catalyst; $BF_3$ etherate catalyst in other examples.

EXAMPLES 12 THROUGH 24

Adducts of polyhalogenated alkylene oxides and polyhydric alcohol initiators

In the manner of Example 2, polyhalogenated alkylene oxides were added gradually to mixtures of polyhydric alcohol initiating compounds and catalysts at such a rate that the temperatures of the reaction mixtures were maintained in the desired range. When the addition of the oxides to the reaction mixtures was complete, the reaction temperatures were maintained for additional periods in order to drive the reaction to completion, and the low boiling materials were then removed by stripping under vacuum. The reactants, reaction conditions, and results for each experiment are summarized in Table II. The oxides employed in these examples were 1,1-dichloro-2,3-epoxypropane, designated as DCEP, and 1,1,1-trichloro-2,3-epoxypropane, designated as TCEP. The polyhydric alcohol initiating compounds used were glycerine and trimethylolpropane (TMP). The various catalysts were boron trifluoride etherate ($BF_3Et$), zinc chloride ($ZnCl_2$), Amberlyst 15 (a sulfonated polymeric resin used for ion exchange purposes and marketed by Rohm and Haas), antimony trifluoride ($SbF_3$), and perfluorobutyric acid (PFBA). The time of addition of the oxide is recorded in the column headed "Addition Time," the total time of reaction in the column headed "Total Reaction Time," and the temperature of reaction in the column headed "Temperature."

TABLE II

| Example | Oxide [1] Used (1) | Polyhydroxy [1] Initiating Compound (2) | Grams | Catalyst Compound | Grams | Reaction Conditions Addn. Time, min. | Total Time, min. | Temp., °C. | Product, wt. percent | Hydroxyl number mol. wt. |
|---|---|---|---|---|---|---|---|---|---|---|
| 12 | DCEP | TMP | 67.0 | ZnCl₂ | 6.7 | 205 | 345 | 62–175 | 52 | 385 |
| 13 [2] | DCEP | Glycerine | 70.0 | BF₃Et | 7.0 | 68 | 128 | 36–49 | 94 | 412 |
| 14 | TCEP | do | 58.0 | BF₃Et | 5.8 | 70 | 131 | 36–67 | 95 | 508 |
| 15 | DCEP | do | 70.0 | BF₃Et | 7.0 | 113 | 142 | 41–51 | 87 | 428 |
| 16 | DCEP | TMP | 94.0 | BFEF | 9.4 | 76 | 136 | 52–59 | 95 | 449 |
| 17 | TCEP | TMP | 79.0 | BF₃Et | 7.9 | 69 | 129 | 46–51 | 96 | 534 |
| 18 | DCEP | TMP | 90.0 | BF₃Et | 9.0 | 112 | 199 | 36–56 | 99 | 783 |
| 19 | TCEP | TMP | 73.0 | BF₃Et | 7.3 | 104 | 164 | 42–60 | 96 | 844 |
| 20 | DCEP | TMP | 67.0 | Amb-15 | 6.7 | 66 | 204 | 49–101 | 47 | |
| 21 | TCEP | TMP | 67.0 | Amb-15 | 6.7 | 80 | 176 | 56–81 | 30 | |
| 22 | DCEP | TMP | 67.0 | SbF₃ | 6.7 | 68 | 113 | 60–131 | 97 | |
| 23 | TCEP | TMP | 67.0 | SbF₃ | 6.7 | 84 | 102 | 70–137 | 82 | 563 |
| 24 | TCEP | TMP | 67.0 | PFBA | 6.7 | 120 | 256 | 56–140 | 52 | |

[1] 3:1 mole ratio of oxide (1) to initiator (2) used in examples 12–17 and 20–24; 6:1 mole ratio in Examples 18 and 19.
[2] 300 g. methylene dichloride used as solvent.

EXAMPLES 25 THROUGH 45

Polyhydroxy ethers from 1,1,1-trichloro-2,3-epoxypropane and from mixed alkylene oxides Additional polyhalogenated polyhydroxy ethers were prepared from 1,1,1-trichloro-2,3-epoxypropane (TCEP), and also from mixtures of 1,1,1-trichloro-2,3-epoxypropane and propylene oxide (PO). These experiments and the results are summarized in Table III. In each example the polyhydroxy initiating compound and catalyst were initially mixed and heated to the reaction temperature. The alkylene oxide reactant, either the trichloropropylene oxide or a mixture of the trichloropropylene oxide and propylene oxide, depending on the reaction, was then added dropwise over a period which is listed for each example in the column headed "Addition Time." After addition of the oxide was complete, the reaction mixture was maintained at the temperature indicated in the column designated "Temp., °C.," for an additional period to permit the reaction to go to completion. The polyhydroxy ether products were washed with dilute sodium bicarbonate solution to remove the catalyst, and then were isolated by vacuum stripping the washed reaction mixture. Example 34 differs from the other examples in that the 1,1,1-trichloro-2,3-epoxypropane was added first, and then the propylene oxide. The catalyst in each example except Example 43 was 10% by weight boron trifluoride etherate based on the hydroxy initiating compound. In Example 43, 10% by weight antimony trifluoride was used as the catalyst.

In each instance where mixtures of polyhydroxy initiating compounds were used, the ratios given are molar ratios. Pluracol SP560 is a polyol marketed by Wyandotte Chemicals Corporation and is a hydroxypropylated sorbitol with a molecular weight of approximately 560.

EXAMPLES 46 THROUGH 53

Non-catalyzed preparation of polyhalogenous polyhydroxy ethers.

Polyhalogenous polyhydroxy ethers were prepared from trimethylolpropane and 1,1-dichloro-2,3-epoxypropane, and from trimethylolpropane and 1,1,1-trichloro-2,3-epoxypropane, in the absence of a catalyst. These reactions and the results are tabulated in Table IV. In each example the trimethylolpropane was initially heated to the reaction temperature indicated in the column of the table headed "Temperature, °C.," and the polyhaloalkylene oxide then added dropwise over a period recorded in the column headed "Addition, Time." When addition of the oxide to the reaction mixture was complete, the reaction mixture was maintained at the reaction temperature for an additional period, and then vacuum stripped of volatile materials. The hydroxyl number of the isolated product was determined and the molecular weight calculated from the hydroxyl number. For convenience 1,1,1-trichloro-2,3-epoxypropane is represented in the table as TCEP, and 1,1-dichloro-2,3-epoxypropane as DCEP.

In each example a volatile material boiling higher than the alkylene oxide was recovered upon stripping the reaction mixture. In the case of Examples 46 through 49, all using 1,1-dichloro-2,3-epoxypropane as the oxide, this material was determined to be 1,1,3-trichloro-2-propanol, apparently resulting from the reaction of the oxide with hydrogen chloride evolved from the adduct. The amount ranged from 16% to 20% in Examples 46 and 47 based on the oxide originally added, and only 1% to 2% in Examples 48 and 49. The amount of the corresponding by-product from the trihalogenoalkylene

TABLE III.—POLYHYDROXY ETHERS

| Example | Oxide Used (1) Moles TCEP | Moles PO | Polyhydric Alcohol Initiator (2) | Mole Ratio, (1)/(2) | Reaction Conditions Temp., °C. | Addn. Time, min. | Total Time, min. | Product, percent theory |
|---|---|---|---|---|---|---|---|---|
| 25 | 2.12 | 1.07 | Trimethylolpropane | 4.5 | 56–60 | 79 | 152 | 91 |
| 26 | 2.12 | 1.07 | do | 4.5 | 50–58 | 58 | 116 | 92 |
| 27 | 2.0 | | Alpha-methylglucoside | 4.0 | 38–57 | 161 | 192 | 83 |
| 28 | 2.14 | | Sorbitol | 6.0 | 75–83 | 95 | 115 | 93 |
| 29 | 2.0 | | do | 4.0 | 65–88 | 180 | 238 | 81 |
| 30 | 1.57 | 0.6 | do | 8.6 | 58–80 | 146 | 176 | 89 |
| 31 | 1.57 | 0.6 | do | 8.6 | 64–81 | 91 | 121 | 94 |
| 32 | 1.76 | 1.03 | 2:1 trimethylolpropane:Sorbitol | 6.4 | 48–68 | 102 | 159 | 93 |
| 33 | 1.76 | | do | 4.0 | 50–65 | 64 | 94 | 95 |
| 34 | 1.76 | 1.03 | do | 6.4 | 49–61 | 73 | 95 | |
| 35 | 1.6 | 0.8 | do | 9.0 | 39–57 | 151 | 173 | 93 |
| 36 | 1.6 | 0.8 | do | 9.0 | 49–64 | 100 | 130 | 84 |
| 37 | 1.6 | 0.8 | do | 9.0 | 57–65 | 105 | 138 | 92 |
| 38 | 0.36 | | Pluracol SP 560 | 0.72 | 56–60 | 17 | 65 | 95 |
| 39 | 0.39 | 0.83 | do | 2.44 | 54–61 | 46 | 88 | 94 |
| 40 | 0.58 | 1.24 | do | 3.64 | 54–59 | 49 | 83 | 89 |
| 41 | 2.0 | | do | 10.0 | 55–67 | 102 | 170 | 93 |
| 42 | 1.52 | 0.76 | Trimethylolpropane | 6.0 | 55–61 | 42 | 92 | 90 |
| 43 [1] | 1.52 | 0.76 | do | 6.0 | 121–128 | 55 | 95 | 82 |
| 44 | 1.89 | 0.63 | Glycerine | 4.1 | 50.56 | 83 | 148 | 96 |
| 45 | 1.89 | 0.63 | 2:1 Glycerine: Sorbitol | 4.0 | 49–58 | 81 | 142 | 97 |

[1] Catalyst, 10% by weight SbF₃.

oxide was generally low. The amount of such by-products boiling higher than the oxide is listed in the column of the table headed "Volatiles stripped, games."

prepared from the data obtained to zero thickness. A comparision of the intrinsic adhesion values shows that the adhesion of the films prepared from the polytrichloro-

TABLE IV.—POLYHALOGENOUS POLYHYDROXY ETHERS

| Example | Oxide Used (1) | | Trimethylol-propane Initiator (2) Grams | Mole Ratio (1)/(2) | Reaction Conditions | | | Stripped Product, Percent of Theory | Volatiles stripped, grams | Hydroxyl number. mol. wt. |
|---|---|---|---|---|---|---|---|---|---|---|
| | Oxide | Grams | | | Temp., °C. | Addn. Time, min. | Total Time, min. | | | |
| 46 | DCEP | 190.5 | 67.0 | 3 | 165-195 | 66 | 218 | 78 | 48.2 | 417 |
| 47 | DCEP | 190.5 | 67.0 | 3 | 180-220 | 150 | 180 | 78 | 39.6 | 392 |
| 48 | DCEP | 127.0 | 134.0 | 1 | 172-183 | 27 | 58 | 96 | 3.2 | 235 |
| 49 | DCEP | 127.0 | 67.0 | 2 | 171-184 | 43 | 94 | 86 | 3.7 | 294 |
| 50 | TCEP | 161.5 | 134.0 | 1 | 163-188 | 26 | 61 | 96 | 4.4 | 258 |
| 51 | TCEP | 161.5 | 67.0 | 2 | 163-176 | 37 | 97 | 87 | 2.9 | 352 |
| 52 | TCEP | 242.3 | 67.0 | 3 | 165-178 | 70 | 189 | 78 | 2.0 | 422 |
| 53 | TCEP | 288 | 67.0 | 3.6 | 169-211 | 180 | 370 | 77 | 11.1 | 536 |

EXAMPLES 54

2:1 adduct of 1,1,1-trichloro-3,4-epoxybutane and ethylene glycol

In the manner of Example 2, an adduct of 1,1,1-trichloro-3,4-epoxybutane and ethylene glycol was prepared by reacting 2 moles of 1,1,1-trichloro-3,4-epoxybutane with 1 mole of ethylene glycol in the presence of an ethyl ether solution of boron trifluoride. After stripping, a polyhalogenous polyhydroxy ether remained as the residue.

The following examples illustrate how certain benefits may be obtained by utilizing polyhalogenous polyethers of the present invention for reaction with other materials to form more complex polymers.

EXAMPLE 55

Preparation and testing of polyurethane films

Polyurethane coating compositions were prepared using three different formulations, as summarized in Table V. For Formula 47, a polytrichloropropylene glycol with a molecular weight of 1003 (PR-664-1) was reacted with a prepolymer (PR-960), using 0.1 percent dibutyltindilaurate catalyst and ethylene dichloride solvent. The polychloropropylene glycol was prepared by first forming 3,3,3-trichloro-1,2-propylene glycol by hydrolyzing 3,3,3-trichloro-1,2-propylene oxide with dilute sulfuric acid, adding $BF_3$ etherate to the 3,3,3-trichloro-1,2-propylene glycol, and then adding more 3,3,3-trichloro-1,2-propylene oxide to give a product with a molecular weight of 1003. The prepolymer was prepared by reacting 2 equivalents of tolylene diisocyanate with a polyhydroxy ether (TP-1540; M.W. 1535) prepared from 1 mole of trimethylolpropane and 24 moles of propylene oxide.

Two other polyurethane coating compositions are also described in Table V in which the polytrichloropropylene glycol was replaced by a copolymer which had a molecular weight of 932 prepared from equimolar proportions of trichloropropylene oxide and dichloropropylene oxide (Formulation 46-1) and by a polypropylene glycol with a molecular weight of 400 (Pluracol P-410).

Each of the polyurethane coating compositions was applied to aluminum panels. The coatings were allowed to air dry at room temperature for 2 hours and then cured by heating at 50° C. for 16 hours. The peel strength and thickness of the cured films were measured; the data being listed below in Table VI. A value, termed the "intrinsic adhesion," was obtained by extrapolating the curves propylene glycol and from the copolymer prepared from trichloropropylene oxide and dichloropropylene oxide was much higher than the adhesion of the films prepared from the non-halogen containing glycol. Moreover, there is a difference in the intrinsic adhesion of the two films prepared from the halogen-containing glycols, the film prepared from the polytrichloropropylene glycol having a higher adhesion than the film prepared from the copolymer of trichloropropylene oxide and dichloropropylene oxide, which contained a lower proportion of halogen.

Polychloropropylene glycol PR-664-1 is 1,1,1-trichloro-2,3-propylene glycol prepared as described above.

TABLE V.—POLYURETHANE COATING COMPOSITIONS

| Formulation Number | Prepolymer PR-960, grams | Copolymer DCPO+TCPO PR-1235-A, grams | Polychloro-propylene glycol PR-664-1, grams | Pluracol P-410, grams | Ethylene Dichloride solvent, grams | DBTDL[1] Catalyst, percent |
|---|---|---|---|---|---|---|
| 46-1 | 8.98 | 4.66 | | | 14 | 0.1 |
| 47 | 8.98 | | 5.02 | | 14 | 0.1 |
| 48 | 8.98 | | | 2.05 | 11 | 0.1 |

[1] DBTDL=Dibutyltindilaurate.

TABLE VI.—ADHESION OF POLYURETHANE FILMS TO ALUMINUM METAL

| Formulation 46-1 | | Formulation 47 | | Formulation 48 | |
|---|---|---|---|---|---|
| Thickness, mils | Peel Strength, grams | Thickness, mils | Peel Strength, grams | Thickness, mils | Peel Strength, grams |
| 4 | 121 | 2.5 | 148 | 2.5 | 36.6 |
| 4.5 | 132 | 3 | 161 | 3 | 37.1 |
| 4.5 | 141 | 4 | 174 | 3 | 37.6 |
| 6 | 156 | 4.5 | 191 | 4 | 36.7 |
| 6.5 | 162 | 5 | 203 | 5 | 37.0 |
| 7 | 163 | 5 | 213 | 6 | 36.8 |
| 8 | 186 | 5.5 | 212 | 7 | 37.9 |
| 9 | 199 | 6 | 237 | 7 | 37.3 |
| 9 | 203 | 6.5 | 237 | 7 | 36.7 |
| 10 | 220 | 6.5 | 236 | 7.5 | 38.2 |
| 10 | 228 | 7 | 260 | 7.5 | 37.7 |
| 10.5 | 230 | 7 | 256 | 8 | 36.9 |
| 11 | 228 | 8.5 | 288 | 9 | 36.9 |
| 11.5 | 241 | 9 | 290 | 9.5 | 37.3 |
| | | | | 10 | 36.0 |
| | | | | 11 | 37.0 |
| | | | | 12 | 37.1 |
| | | | | 12.5 | 38.1 |
| | | | | 12.5 | 37.9 |
| | | | | 13 | 36.9 |
| | | | | 13.5 | 38.0 |
| | | | | 13.5 | 36.8 |

In a second test, the correlation between the film strength and the amount of polytrichloropropylene glycol incorporated in the film was investigated. Polyurethane formulations varying proportions of polytrichloropropylene glycol with a molecular weight of 1003 (PR-664-1), prepared as described above, and a polypropylene glycol with a molecular weight of 400 (P-410) were prepared according to the compositions shown in Table VII.

TABLE VII.—POLYURETHANE COATING COMPOSITIONS

| Example | Prepolymer PR-960, grams | Polychloro-propylene glycol PR-664-1, grams | Polypropyl-ene glycol P-410, grams | Equivalent Molar Ratio, PR-664-1/P-410 | Ethylene Dichloride Solvent, grams | DBTDL [1] Catalyst, percent |
|---|---|---|---|---|---|---|
| 56 | 8.98 | | 2.05 | | 11 | 0.1 |
| 57 | 8.98 | 5.02 | | | 14 | 0.1 |
| 58 | 8.98 | 2.51 | 1.03 | 50:50 | 13 | 0.1 |
| 59 | 8.98 | 3.77 | 0.51 | 75:25 | 13 | 0.1 |
| 60 | 8.98 | 1.25 | 1.54 | 25:75 | 12 | 0.1 |

[1] DBTDL=Dibutyltindilaurate.

Each of these polyurethane coating compositions was applied to aluminum panels. The coated compositions were cured in the manner described above the peel strengths and film thickness of cured films were measured. The data are listed in Table VIII.

TABLE VIII.—ADHESION OF POLYURETHANE FILMS TO ALUMINUM METAL

| Example 56 | | Example 57 | | Example 58 | | Example 59 | | Example 60 | |
|---|---|---|---|---|---|---|---|---|---|
| Thickness, mils | Peel Strength, grams | Thickness, mils | Peel strength, grams | Thickness, mils | Peel strength, grams | Thickness, mils | Peel strength, grams | Thickness, mils | Peel strength, grams |
| 3 | 39 | 2.5 | 152 | 3 | 55 | 3 | 89 | 2 | 34 |
| 3.5 | 35 | 3 | 158 | 5 | 53 | 3.5 | 93 | 4 | 35 |
| 4.5 | 42 | 3.5 | 170 | 6 | 59 | 3.5 | 95 | 5 | 42 |
| 6 | 35 | 4 | 197 | 7 | 58 | 4 | 99 | 7 | 41 |
| 6 | 41 | 5 | 197 | 10 | 60 | 4 | 103 | 8 | 48 |
| 6.5 | 35 | 5.5 | 210 | 10 | 64 | 4 | 107 | 9 | 48 |
| 7.5 | 41 | 6 | 222 | 11 | 60 | 4 | 109 | 10 | 44 |
| 8 | 36 | 6 | 232 | 11 | 70 | 4.5 | 106 | 11 | 48 |
| 9.5 | 39 | 6.5 | 232 | 12 | 68 | 4.5 | 111 | 12 | 46 |
| 9.5 | 42 | 7 | 253 | 13 | 65 | 4.5 | 113 | 13 | 49 |
| 10 | 36 | 7 | 258 | 14 | 69 | 4.5 | 116 | | |
| 11 | 41 | 8.5 | 285 | 16 | 69 | 5 | 119 | | |
| 11 | 36 | 9 | 289 | 16 | 72 | 6 | 172 | | |
| 12.5 | 38 | | | 17 | 72 | 7 | 147 | | |
| 12.5 | 41 | | | | | 8 | 157 | | |
| 13.5 | 37 | | | | | 9 | 172 | | |
| | | | | | | 10 | 171 | | |
| | | | | | | 10 | 173 | | |
| | | | | | | 11 | 184 | | |
| | | | | | | 12 | 202 | | |
| | | | | | | 14 | 227 | | |
| | | | | | | 15 | 236 | | |
| | | | | | | 15 | 241 | | |
| | | | | | | 16 | 247 | | |
| | | | | | | 16 | 255 | | |
| | | | | | | 16 | 257 | | |
| | | | | | | 17 | 260 | | |
| | | | | | | 17 | 266 | | |

A comparison of the intrinsic adhesion values shows that the adhesion of the films containing the highest proportion of polytrichloropropylene glycol had the highest adhesion strength, and that, as the proportion of polytrichloropropylene glycol in the composition became less, the peel strength of the films decreased.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:
1. A polyhalogenous polyhydroxy ether comprising the product formed by mixing and reacting together at an elevated temperature and in the presence of a catalytic amount of a Lewis acid:
   (1) a polyhydric alcohol initiating compound having a maximum of 8 hydroxy groups,
   (2) a halogenated propylene oxide having an alkyl group attached to a carbon atom of the oxirane ring, said alkyl group having a maximum of 2 carbon atoms and containing at least 2 chloride atoms bonded to the same terminal carbon atom, (1) and (2) being in a molar ratio of about 1:1 to about 1:24,
said ether being charactized by the presence of pendant alkyl groups having a maximum of two carbon atoms, and having at least two halogen atoms bonded to the same terminal carbon atom.

2. A polyhydroxy ether of claim 1 wherein (2) is 1,1,1-trichloro-2,3-epoxypropane.

3. A polyhydroxy ether as defined in claim 1 of trimethylolpropane and 1,1,1-trichloro-2,3-epoxypropane, wherein said trimethylolpropane and 1,1,1-trichloro-2,3-epoxypropane are in a molar ratio of about 1:1 to about 1:12.

4. A polyhydroxy ether as defined in claim 1 of glycerine and 1,1,1-trichloro-2,3-epoxypropane, wherein said glycerine and 1,1,1-trichloro-2,3-epoxypropane are in a molar ratio of about 1:1 to about 1:12.

5. A polyhydroxy ether as defined in claim 1 of sorbitol and 1,1,1-trichloro-2,3-epoxypropane, wherein said sorbitol and 1,1,1-trichloro-2,3-epoxypropane are in a molar ratio of about 1:1 to about 1:24.

6. A polyhydroxy ether as defined in claim 1 of alpha-methylglucoside and 1,1,1-trichloro-2,3-epoxyproprane, wherein said alpha-methylglucoside and 1,1,1-trichloro-2,3-epoxypropane are in a molar ratio of about 1:1 to about 1:16.

7. A polyhydroxy ether as defined in claim 1 of trimethylolpropane, sorbitol, and 1,1,1-trichloro-2,3-epoxypropane, wherein the sum of the number of moles of trimethylolpropane and sorbitol and the number of moles of 1,1,1-trichloro-2,3-epoxypropane are in a ratio of about 1:1 to about 1:18.

8. A polyhalogenous polyhydroxy ether comprising the product formed by mixing and reacting together at an elevated temperature and in the presence of a catalytic amount of a Lewis acid:
   (1) a polyhydric alcohol initiating compound having a maximum of 8 hydroxy groups,
   (2) a halogenated propylene oxide having an alkyl group attached to a carbon atom of the oxirane ring, said alkyl group having a maximum of 2 carbon atoms and containing at least 2 chloride atoms bonded to the same terminal carbon atom, and
   (3) a vicinal alkylene oxide having a maximum of one halogen atom on any one carbon atom, the number of moles of (1) and the sum of the number of moles of (2) and (3) being in a ratio of about 1:1 to about 1:24, said ether being characterized by the presence of pendant alkyl groups having a maximum of 2 carbon atoms, and having at least 2 halogen atoms bonded to the same terminal carbon atom, wherein said alkylene oxide (2) is present in an amount of at least 10% by weight of the total of said alkylene oxide (2) and said alkylene oxide (3).

9. A polyhydroxy ether of claim 8 wherein (1) is trimethylolpropane, (2) is 1,1,1-trichloro-2,3-epoxypropane, and (3) is propylene oxide, the 1,1,1-trichloro-2,3-epoxypropane being present in the amount of at least about 10% by weight of the total of (2) and (3), wherein the number of moles of trimethylolpropane and the sum of the number of moles of 1,1,1-trichloro-2,3-epoxypropane and propylene oxide are in a molar ratio of about 1:1 to about 1:12.

10. A polyhydroxy ether as defined in claim 8 of (1) sorbitol, (2) 1,1,1-trichloro-2,3-epoxypropane, and (3) propylene oxide, the 1,1,1-trichloro-2,3-epoxypropane being present in the amount of at least about 10% by weight of (2) and (3), wherein the number of moles of sorbitol and the sum of the number of moles of 1,1,1-trichloro-2,3-epoxypropane and propylene oxide are in a molar ratio of about 1:1 to about 1:24.

11. A polyhydroxy ether as defined in claim 8 of (1) trimethylolpropane, (2) sorbitol, (3) 1,1,1-trichloro-2,3-epoxypropane, and (4) propylene oxide, the 1,1,1-trichloro-2,3-epoxypropane being present in the amount of at least about 10% by weight of (3) and (4), wherein the sum of the number of moles of trimethylolpropane and sorbitol and the sum of the number of moles of 1,1,1-trichloro-2,3-epoxypropane and propylene oxide are in a ratio of about 1:1 to about 1:18.

12. A polyhalogenous polyhydroxy ether according to claim 1 wherein said halogenated propylene oxide (2) is 1,1-dichloro-2,3-epoxypropane.

13. A polyhalogenous polyhydroxy ether according to claim 1 wherein said polyhydric alcohol (1) is trimethylolpropane and said halogenated propylene oxide is 1,1-dichloro-2,3-epoxypropane, and wherein said trimethylolpropane and 1,1-dichloro-2,3-epoxypropane are present in a molar ratio of about 1:1 to about 1:12.

14. A polyhalogenous polyhydroxy ether according to claim 1 wherein said polyhydric alcohol (1) is glycerine and said halogenated propylene oxide (2) is 1,1-dichloro-2,3-epoxyproprane, and wherein said glycerine and said 1,1-dichloro-2,3-epoxypropane are present in a molar ratio of about 1:1 to about 1:12.

References Cited

UNITED STATES PATENTS

| | | |
|---|---|---|
| 2,327,053 | 8/1943 | Marple et al. |
| 2,581,464 | 1/1952 | Zech. |
| 2,700,686 | 1/1955 | Dickey et al. |
| 3,135,706 | 6/1964 | Vandenberg. |
| 3,016,404 | 1/1962 | Beauchamp et al. |
| 3,244,754 | 4/1966 | Bruson et al. |

OTHER REFERENCES

Eposydverbindungen und Eposydharze, Paquin, Copy Group 140 (1958; p. 241).

WILLIAM H. SHORT, *Primary Examiner.*

T. E. PERTILLA, *Assistant Examiner.*